Dec. 28, 1965 G. E. WISE 3,225,915
COMBINED CLOSURE, STIRRER, AND CONDIMENT CONTAINER
FOR DRINKING VESSEL
Original Filed April 25, 1961

Inventor
Glenn E. Wise

United States Patent Office 3,225,915
Patented Dec. 28, 1965

3,225,915
COMBINED CLOSURE, STIRRER, AND CONDIMENT CONTAINER FOR DRINKING VESSEL
Glenn E. Wise, 2415 39th Place NW., Washington 7, D.C.
Continuation of application Ser. No. 105,472, Apr. 25, 1961. This application Sept. 28, 1964, Ser. No. 403,429
6 Claims. (Cl. 206—47)

This application is a continuation of my application Serial No. 105,472, filed April 25, 1961, now abandoned.

This invention relates to a combined closure, stirrer, and condiment container for use with a drinking vessel or receptacle such as a paper or plastic disposable or "throw away" cup, or the like. More particularly, the invention comprises a disposable closure assembly of such form that it is adapted to perform three distinct functions.

First, the closure assembly is designed to serve as a lid for covering the open top of a vessel of the type mentioned above. Second, the closure assembly is formed so as to provide at least one enclosed compartment in which a condiment or condiments, of the type normally used as additives in beverages, may be stored until use. Third, a portion or portions of the closure are designed to be detached from the remainder whereby access is provided to the interior of the storage compartment or compartments. Once such a portion has been detached, it becomes usable for stirring a condiment into a beverage.

Many restaurants and snack bars, and the like, vend coffee, tea, and other beverages in "throw away" cups. Under present practice, especially when the beverages are to be consumed at some distance from the point of purchase, by the purchaser or consumers other than the purchaser, the cups are first filled with beverage, and, in the case where the beverage is coffee, cream and sugar are often added. Then disposable lids are used to close the cups to prevent the beverage from spilling out during transit, and also to retain heat in the beverage, if it is a heated beverage. To satisfy those cases where the buyer is unsure of the personal tastes of the ultimate consumer of a particular beverage, the vendor normally supplies small individual packets of sugar or other condiments which may be added at the point of consumption by the ultimate consumer. Also, the vendor normally supplies a wooden or plastic spoon or other stirrer with each cup of beverage sold.

One object of this invention is to replace the separate lid, condiment packet and stirrer, mentioned just above, with a unitary, condiment storing closure having stirring means incorporated therewith whereby a beverage vendor or other user is relieved of performing the plurality of motions necessary in assembling the separate articles.

Another object of the invention is to provide a closure or lid with means for storing one or more condiments therein.

Another object of the invention is to provide a closure or lid with detachable stirring means.

Another object is to provide a unitary condiment-storing, stirrer-including, disposable closure for throw-away plastic or paper food or beverage serving receptacles.

Other objects will be apparent from the remainder of the specification, and from the drawings.

In the drawings which form a part of this application are shown two forms in which this invention may be embodied, it being understood that these forms are illustrative only and are not intended to limit the invention to such forms:

Figure 1:
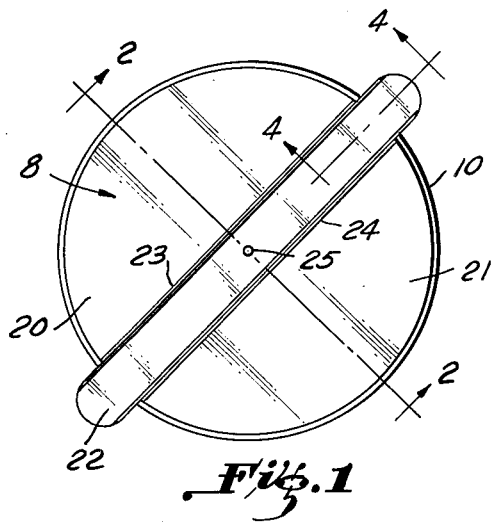
FIGURE 1 is a plan view of a first form of the invention.

Referring now to FIGURES 1 to 4 of the drawings by reference numerals, there is seen a form of the invention wherein the removal of a single stirrer portion from the remainder of the closure assemblage allows access to two separated condiment storage compartments. This form of the invention is composed of a bottom, designated generally as 7, and a top, designated generally as 8.

Figure 3:
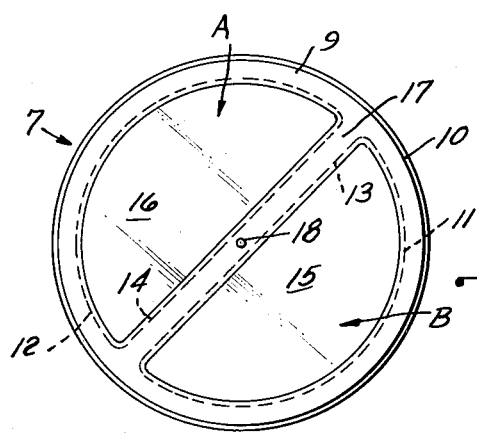
FIGURE 3 is a pain view of the bottom element utilized in both forms of the invention.
Figure 4:
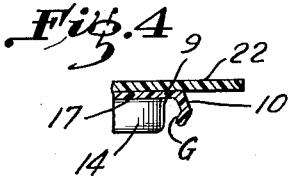
FIGURE 4 is a partial sectional view taken on the line 4—4 of FIGURE 1.

Bottom 7, more particularly, includes an annular rim portion 9. Integral with and depending from the outside of portion 9 is an angulated lip 10. Integral with and depending from inside segments of portion 9 are separated and opposed C-shaped vertical wall-forming portions 11 and 12, and connecting the opposite ends of each of walls 11 and 12 are additional vertical wall-forming portions 13 and 14, respectively. This, as best seen in FIGURE 3, wall portions 11 and 13 cooperate to enclose a first D-shaped space, and by providing a horizontally oriented D-shaped wall portion 15 integral with and extending between the respective bottom edges of wall portions 11 and 13, a first condiment storage compartment is formed.

Similarly, wall portions 12 and 14 cooperate to enclose a second D-shaped space, and by providing a horizontally oriented D-shaped wall portion 16, integral with and extending between the respective bottom edges of wall portions 12 and 14, a second condiment storage compartment B is formed.

Extending between and integral with the tops of wall portions 13 and 14 is a horizontally oriented connector wall 17. Wall 17 is coplanar with and merges integrally at each of its ends into rim portion 9. At the midcenter of wall 17 is provided a vertically oriented aperture 18 which serves as a vent hole, as will be described.

Top 8, more particularly, consists of a substantially flat, disk-like element composed of three distinct, yet integral portions, namely: a first segment 20, a second segment 21, and a stirrer 22. V grooves 23 and 24 are provided between segment 20 and stirrer 22 and between segment 21 and stirrer 22, respectively, so that the stirrer may be easily torn away from the segments, as will be described. In the mid-center of stirrer 22 is formed a vertically oriented aperture 25, which is adapted to align with the aperture 18 in the bottom 7, when elements 7 and 8 are assembled, as will be described.

Apertures 18 and 25 may also serve as means for centering top 8 upon bottom 7. For example, if a straight pin were entered through both apertures then the two parts 7 and 8 would be properly centered for bonding together, as will be described.

A description of the mode of operation of the first embodiment of the invention follows:

Starting with the bottom 7 and top 8 separated from each other, bottom 7 is oriented so that rim 9 is uppermost and lies substantially in a horizontal plane. Granulated sugar and powdered cream (or any other liquid or solid condiment or flavoring, or the like) are then deposited, respectively and separately, in compartments A and B almost to the level of rim 9. The top 8, with V grooves 23 and 24 upright, is now oriented above bottom 7 in such manner that apertures 18 and 25 are in axial alignment and the longitudinal centerlines of stirrer 22 and connector wall 17 are aligned. Finally, top 8 is lowered straight down upon rim 9 and wall 17 of the bottom 7 and the top 8 is then either heat-sealed, in the case where elements 7 and 8 are formed of heat-sealable thermo-plastic material, or bonded by means of an adhesive (not shown) all around its periphery to rim 9. A bond may also be formed between top 8 and wall 17 if desired. This latter bond would serve to prevent the separated condiments from intermixing by passing over the top of wall 17.

The two parts 7 and 8, now being joined, and compartments A and B now being filled with suitable condiments, this first embodiment is now ready for use.

In use, the assembly just described first functions as a removable lid or closure to cover the top of a filled, disposable paper or plastic cup. During the duration of this function, the usual rolled or formed rim of such a cup would be entered into the groove G, FIGURE 2, just inside lip 10. The vent formed by the aligned apertures 18 and 25 allow any excess air to escape from the cup when the closure is placed thereon.

When a user desires to consume the beverage or other material within the cup, he first removes the closure assembly therefrom. Then, while holding the closure assembly level and with the top 8 uppermost either extending end of stirrer 22 is raised relative to the remainder of the assembly. This will cause stirrer 22 to break loose from segments 20 and 21, along grooves 23 and 24, thus exposing and providing an exit for the condiments in both compartments A and B. Now, by manipulating the assembly, the desired amounts of the stored condiments can be caused to flow out of the compartments and into the cup. Upon completion of this condiment dispensing step, the stirrer may be utilized to agitate and mix the condiment into the material within the cup, after which the entire invention may be discarded.

The description of the first illustrated embodiment of the invention has now been completed.

Figure 5:
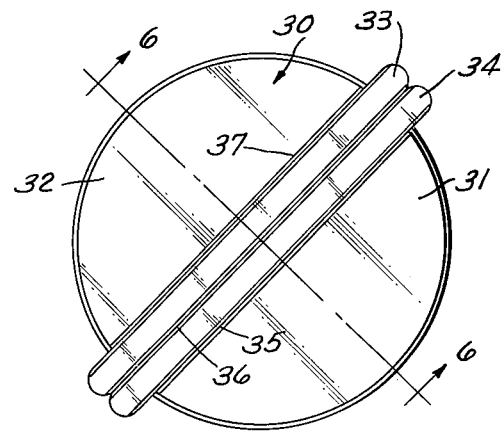
FIGURE 5 is a plan view of a second form of the invention.
Figure 2:
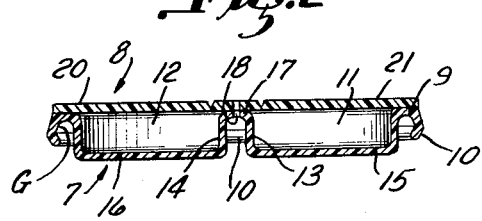
FIGURE 2 is a sectional view taken on the line 2—2 of FIGURE 1.
Figure 6:
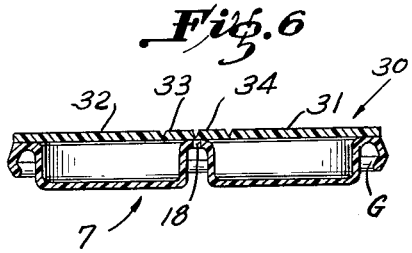
FIGURE 6 is a sectional view taken on the line 6—6 of FIGURE 5.

Referring now to FIGURES 3, 5 and 6, there is seen a second form of the invention wherein removal of a stirrer portion allows access to but a single condiment storage compartment, and not to a plurality of compartments as in the case of the first embodiment. This modification is particularly suited to those consumers who utilize only one condiment with a particular beverage, for example, only sugar with their coffee.

Since the same configuration is employed for the bottom element in both forms of the invention, reference is made to FIGURE 3 and the description, supra, for details of the bottom 7. The top element of the second embodiment of the invention, however, differs from top 8 of the first form, and is designated generally as 30.

More particularly, top 30 consists of a substantially flat, disk-like element composed of four distinct, yet integral portions, namely, a first segment 31, a second segment 32, and two identical stirrers 33 and 34. V grooves 35, 36 and 37 are formed in top 30, as seen in FIGURES 5 and 6, so that either stirrer may be easily torn away from its adjacent segment and stirrer, or so that both stirrers may be simultaneously torn away from segments 31 and 32, as will be described. Top 30 as shown contains no vent hole, but one could obviously be provided if such is deemed desirable.

The filling of the condiment storage compartments and the bonding of top 30 on bottom 7 in the second form of the invention is identical to that previously described concerning the first form with two exceptions. First, since top 30 has no vent hole, no regard need be given to alignment of venting apertures as in the first form, although top 30 must still be centered upon bottom 7 with the longitudinal axes of the stirrers 33 and 34 parallel with the longitudinal axis of connector wall 17. Secondly, it is important in the second form of the invention that the top 30 be bonded not only to the rim 9 along its entire periphery, but also that the top 30 be bonded to the top of connector wall 17 along its entire length so that the removal of one stirrer will not open an accessway into the compartment closed by the other stirrer.

In both forms of the invention the stirrers are dimensioned so that the assemblies of which they form a part can be oriented to lie within imaginary squares having sides just slightly larger than the outside diameter of bottom 7. This is done so that a plurality of my closures can be rested one atop another in a square container for shipping.

The assembly, just described, which forms the second embodiment of the invention is used first as a lid to cover a drinking receptacle. However, when a user desires to drink from the receptacle, he removes the assembly, and by pulling upwardly on the end of one or the other or both of the stirrers 33 and 34 he can gain access either to compartment A, and to the particular condiment stored therein, or to compartment B, and the condiment stored therein, or to both compartments and their respective contents simultaneously. After removal the stirrer or stirrers can be used to mix the material in the cup.

So that the user may be informed of the contents of a given compartment before he detaches a stirrer in either form of the invention, the tops 7 and 30 may be provided with appropriate printing. For example, the segment 20 in FIGURE 1, which overlies compartment A in use, might have imprinted thereon SUGAR, and similarly segment 21 might have imprinted thereon CREAM. An alternative means of providing the user with knowledge of the contents of a given compartment would be to form the invention (either form) of highly transparent material whereby he could tell the granules of sugar, for example, by visual inspection.

Throughout the application, the term "condiment" is defined to encompass any and all additives that a user should choose to add to any beverage for any purpose. Sugar, powdered milk or cream, saccharin, bicarbonate of soda powder are mentioned by way of example.

Having now described two illustrative embodiments of my invention, what I claim as new and desire to secure by Letters Patent is:

1. A closure structure for a vessel, said closure comprising: a bottom; said bottom including horizontal base forming means and upstanding wall forming means attached to the periphery of said base forming means and providing at least one compartment; other wall forming means located in said compartment, said other wall forming means exhibiting, at least at one location, an inverted substantially U-shaped vertical cross-section with lower portions of said other wall forming means attached to said base forming means, said other wall forming means also including at least a portion substantially centered with respect to said base forming means; a top means attached to said bottom and closing said compartment; said top means including pre-formed integral detachable stirrer means engaging the top of said other wall-forming means, said stirrer means having a portion overlying said compartment whereby detachment of said stirrer means provides an opening into said compartment.

2. A closure structure for a vessel, said closure comprising: a bottom, said bottom including means forming a pair of compartments separated from each other by wall forming means; top forming means attached to said bottom and closing each of said compartments; said top forming means including stirrer forming means, said stirrer forming means including two stirrers each having a portion overlying a different one of said compartments, detachment of one stirrer providing an opening into one of said compartments and detachment of the other stirrer providing an opening into the other of said compartments.

3. A closure structure for a vessel, said closure structure comprising: a bottom, said bottom including means forming a pair of compartments separated from each other by straight elongated wall forming means; top forming means attached to said bottom and closing each of said compartments; said top forming means including preformed integral detachable stirrer forming means engaging said wall forming means, said stirrer forming means being located substantially parallel to the length of said wall forming means and having a portion overlying at least one of said compartments, detachment of said stirrer forming means providing an opening into at least said one of said compartments.

4. The combination of claim 3, wherein said stirrer forming means overlies both of said compartments whereby detachment of said stirrer forming means provides an opening into both of said compartments.

5. The combination of claim 3, said bottom including a downwardly opening grooved rim around the periphery thereof adapted to seat upon the upper rim of a vessel, and said wall and said stirrer forming means each including an aperture which communicate with each other to form vent forming means for said vessel.

6. The combination of claim 3 wherein said stirrer former means and said top forming means are coplanar.

References Cited by the Examiner
UNITED STATES PATENTS

| | | |
|---|---|---|
| 1,211,282 | 1/1917 | Braunstein. |
| 1,457,998 | 6/1923 | Norwood _____ 229—1.5 |
| 1,514,379 | 11/1924 | Fleischer. |
| 1,576,088 | 3/1926 | Bunz. |
| 1,607,865 | 11/1926 | Butler. |
| 1,625,335 | 4/1927 | Schneider. |
| 1,657,325 | 1/1928 | Suttle. |
| 2,705,579 | 4/1955 | Mason. |
| 2,760,671 | 8/1956 | Parish _____ 220—27 |
| 2,766,796 | 10/1956 | Tupper _____ 220—23 |
| 2,862,128 | 11/1958 | Heldfond _____ 215—38 |
| 2,878,128 | 3/1959 | Jorgenson _____ 99—171 |
| 2,941,660 | 6/1960 | Tupper _____ 206—46 |

THERON E. CONDON, *Primary Examiner.*